(12) United States Patent
Kim et al.

(10) Patent No.: US 12,374,727 B2
(45) Date of Patent: Jul. 29, 2025

(54) BATTERY SYSTEM INCLUDING CONTROL UNIT CONFIGURED TO SET DRIVING VOLTAGE RANGE FOR CHARGING AND DISCHARGING OF SECONDARY BATTERY TO SPECIFIC RANGE, AND METHOD OF USING SAME AND BATTERY PACK INCLUDING SAME

(71) Applicant: LG ENERGY SOLUTION, LTD., Seoul (KR)

(72) Inventors: Young Jae Kim, Daejeon (KR); Jung Woo Yoo, Daejeon (KR); Ye Lin Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 673 days.

(21) Appl. No.: 17/635,254

(22) PCT Filed: Sep. 22, 2020

(86) PCT No.: PCT/KR2020/012772
§ 371 (c)(1),
(2) Date: Feb. 14, 2022

(87) PCT Pub. No.: WO2021/060803
PCT Pub. Date: Apr. 1, 2021

(65) Prior Publication Data
US 2022/0285744 A1 Sep. 8, 2022

(30) Foreign Application Priority Data

Sep. 23, 2019 (KR) .................. 10-2019-0117068

(51) Int. Cl.
*H01M 10/44* (2006.01)
*H02J 7/00* (2006.01)
(Continued)

(52) U.S. Cl.
CPC .......... *H01M 10/44* (2013.01); *H02J 7/0013* (2013.01); *H01M 2004/021* (2013.01);
(Continued)

(58) Field of Classification Search
CPC ..................................................... H01M 10/44
(Continued)

(56) References Cited

U.S. PATENT DOCUMENTS

2005/0106464 A1  5/2005  Yoshida et al.
2014/0011098 A1  1/2014  Jeon et al.
(Continued)

FOREIGN PATENT DOCUMENTS

CN    104221206 A    12/2014
CN    105052001 A    11/2015
(Continued)

OTHER PUBLICATIONS

International Search Report (with English translation) and Written Opinion issued in corresponding International Patent Application No. PCT/KR20/12772, dated Jan. 4, 2021.

*Primary Examiner* — Yalkew Fantu
(74) *Attorney, Agent, or Firm* — Bryan Cave Leighton Paisner LLP

(57) ABSTRACT

The present invention provides a battery system including one or more secondary batteries each including a negative electrode including a silicon-based active material, a positive electrode facing the negative electrode, a separator interposed between the negative electrode and the positive electrode, and an electrolyte and a control unit configured to set a driving voltage range for charging and discharging of the secondary batteries, wherein a maximum driving voltage of the secondary battery set by the control unit is in a range
(Continued)

of 4.00 V to 4.08 V, and a minimum driving voltage of the secondary battery set by the control unit is in a range of 2.98 V to 3.07 V.

10 Claims, 1 Drawing Sheet

(51) Int. Cl.
*H01M 4/02* (2006.01)
*H01M 4/38* (2006.01)
*H01M 4/505* (2010.01)
*H01M 4/525* (2010.01)
*H01M 4/62* (2006.01)
*H01M 10/0525* (2010.01)

(52) U.S. Cl.
CPC .......... *H01M 2004/027* (2013.01); *H01M 2004/028* (2013.01); *H01M 4/386* (2013.01); *H01M 4/505* (2013.01); *H01M 4/525* (2013.01); *H01M 4/622* (2013.01); *H01M 10/0525* (2013.01)

(58) Field of Classification Search
USPC ........................................... 320/128
See application file for complete search history.

(56) References Cited

U.S. PATENT DOCUMENTS

| | | |
|---|---|---|
| 2014/0077769 A1 | 3/2014 | Maleki et al. |
| 2015/0243973 A1 | 8/2015 | Newbound et al. |
| 2015/0263342 A1 | 9/2015 | Newbound et al. |
| 2015/0303512 A1 | 10/2015 | Kimura et al. |
| 2015/0340740 A1 | 11/2015 | Jeon et al. |
| 2016/0245871 A1* | 8/2016 | Joe ................ G01R 31/3842 |
| 2017/0077732 A1 | 3/2017 | Otaki et al. |
| 2017/0338476 A1 | 11/2017 | Newbound et al. |
| 2018/0323631 A1 | 11/2018 | Otaki et al. |
| 2020/0039376 A1 | 2/2020 | Miyaki et al. |
| 2020/0067129 A1* | 2/2020 | Hao ..................... H01M 4/386 |
| 2020/0127265 A1* | 4/2020 | Min ..................... H01M 50/434 |
| 2020/0251728 A1 | 8/2020 | Song et al. |
| 2021/0013491 A1 | 1/2021 | Newbound et al. |

FOREIGN PATENT DOCUMENTS

| | | | |
|---|---|---|---|
| CN | 109075381 A | | 12/2018 |
| EP | 20170025873 | * | 3/2017 |
| JP | H08-315860 A | | 11/1996 |
| JP | 2005-150038 A | | 6/2005 |
| JP | 2005-340109 A | | 12/2005 |
| JP | 2014-130717 A | | 7/2014 |
| JP | 2018-077939 A | | 5/2018 |
| KR | 10-0965710 B1 | | 6/2010 |
| KR | 10-2015-0043213 A | | 4/2015 |
| KR | 10-1702406 B1 | | 2/2017 |
| KR | 10-2017-0025873 A | | 3/2017 |
| KR | 10-2017-0074030 A | | 6/2017 |
| KR | 10-2017-0111513 A | | 10/2017 |
| KR | 10-2018-0039001 A | | 4/2018 |
| KR | 10-2019-0028201 A | | 3/2019 |
| KR | 10-2019-0044450 A | | 4/2019 |
| KR | 10-2019-0065180 A | | 6/2019 |
| KR | 10-2010015 B1 | | 8/2019 |
| WO | 2018/029907 A1 | | 2/2018 |
| WO | 2018190260 A | | 10/2018 |
| WO | 2018-201427 A1 | | 11/2018 |

* cited by examiner

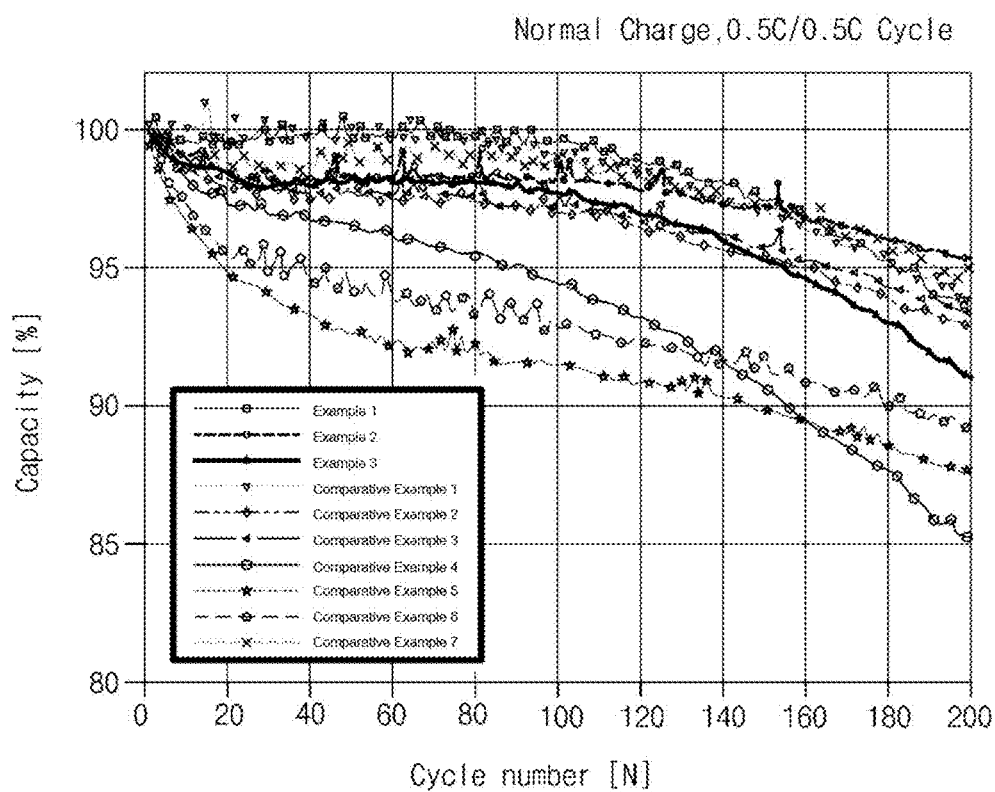

BATTERY SYSTEM INCLUDING CONTROL UNIT CONFIGURED TO SET DRIVING VOLTAGE RANGE FOR CHARGING AND DISCHARGING OF SECONDARY BATTERY TO SPECIFIC RANGE, AND METHOD OF USING SAME AND BATTERY PACK INCLUDING SAME

CROSS-REFERENCE TO RELATED APPLICATION

This application claims priority to and the benefit of Korean Patent Application No. 10-2019-0117068, filed on Sep. 23, 2019, the disclosure of which is incorporated herein by reference in its entirety.

TECHNICAL FIELD

The present invention relates to a battery system, and a method of using the same and a battery pack including the same.

BACKGROUND ART

Batteries are widely used in various fields such as mobile devices, for example, mobile phones, laptop computers, smartphones, smart pads, and the like as well as vehicles (electric vehicles (EVs), hybrid electric vehicles (HEVs), or plug-in hybrid electric vehicles (PHEV)) which are driven by electricity, or large-capacity energy storage systems (ESS).

Batteries may typically be mounted on a device or apparatus in the form of one or more battery modules or battery packs. The battery may include one or more secondary batteries, and may further include electronic components, such as a battery management system (BMS), or a case in addition to the secondary batteries. The secondary batteries refer to batteries that are rechargeable, unlike primary batteries that are not rechargeable. In particular, among various secondary batteries, lithium secondary batteries are lightweight and have high energy density, and thus are receiving the spotlight as a driving power source for portable devices. Accordingly, efforts on research and development for improving the performance of the lithium secondary battery have been actively made.

The lithium secondary battery generally includes a positive electrode, a negative electrode, a separator interposed between the positive electrode and the negative electrode, an electrolyte, an organic solvent, and the like. In addition, in the positive electrode and the negative electrode, an active material layer including positive electrode active materials or negative electrode active materials may be formed on a current collector. In general, lithium-containing metal oxides such as $LiCoO_2$, $LiMn_2O_4$, and the like are used as the positive electrode active materials in the positive electrode, and thus, carbon-based active materials or silicon-based active materials which do not contain lithium are used as the negative electrode active materials in the negative electrode.

In particular, among the negative electrode active materials, silicon-based active materials have attracted great attention because the capacity thereof is about 10 times higher than that of carbon-based active materials and have an advantage of realizing high energy density even with a thin electrode due to their high capacity. However, the silicon-based active materials have not been commonly used due to having a problem in which volume expansion occurs due to charging and discharging, and accordingly, lifespan characteristics are deteriorated.

Accordingly, there is a need to develop a secondary battery capable of improving lifespan characteristics while realizing high capacity and high energy density of the silicon-based active material.

Korean Unexamined Patent Publication No. 10-2017-0074030 relates to a negative electrode active material for a lithium secondary battery, a method of preparing the same and a lithium secondary battery including the same, and discloses a negative electrode active material including a porous silicon-carbon composite, but there is a limitation in solving the above-described problems.

PRIOR-ART DOCUMENT

Patent Document

Korean Unexamined Patent Publication No. 10-2017-0074030

DISCLOSURE

Technical Problem

The present invention is directed to providing a battery system capable of exhibiting improved capacity, energy density, and lifespan characteristics by adjusting a driving voltage range of a secondary battery.

The present invention is also directed to providing a method of using a battery system that is capable of exhibiting improved capacity, energy density, and lifespan characteristics by adjusting a driving voltage range of a secondary battery.

The present invention is also directed to providing a battery pack including the battery system.

Technical Solution

One aspect of the present invention provides a battery system including: one or more secondary batteries each including a negative electrode including a silicon-based active material, a positive electrode facing the negative electrode, a separator interposed between the negative electrode and the positive electrode, and an electrolyte; and a control unit configured to set a driving voltage range for charging and discharging of the secondary batteries, wherein a maximum driving voltage of the secondary battery set by the control unit is in a range of 4.00 V to 4.08 V, and a minimum driving voltage of the secondary battery set by the control unit is in a range of 2.98 V to 3.07 V.

Another aspect of the present invention provides a method of using a battery system including: manufacturing a battery system including one or more secondary batteries and a control unit that is configured to set a driving voltage range for charging and discharging of the secondary batteries; and setting the driving voltage range such that a maximum driving voltage of the secondary battery is in a range of 4.00 V to 4.08 V and a minimum driving voltage of the secondary battery is in a range of 2.98 V to 3.07 V through the control unit and charging and discharging the secondary battery for at least one cycle, wherein the secondary battery includes a negative electrode including a silicon-based active material, a positive electrode facing the negative electrode, a separator interposed between the negative electrode and the positive electrode, and an electrolyte.

Still another aspect of the present invention provides a battery pack including the battery system described above.

Advantageous Effects

A battery system of the present invention includes a secondary battery including a silicon-based active material and a control unit capable of setting a driving voltage range of the secondary battery to a specific range, and can charge and discharge the secondary battery within the driving voltage range set by the control unit. Accordingly, the battery system of the present invention can prevent the volume expansion of the silicon-based active material to a desirable level, so that lifespan performance of the silicon-based active material can be improved, and at the same time, high energy density can be achieved.

Further, according to a method of using a battery system of the present invention, a degree of volume expansion of a silicon-based active material can be reduced to an appropriate level by adjusting a driving voltage range for charging and discharging of a secondary battery including the silicon-based active material to a specific level, and thus the battery system can be driven so that lifespan performance can be significantly improved, and at the same time, high energy density can be exhibited.

DESCRIPTION OF DRAWINGS

FIG. 1 is a graph illustrating the evaluation of capacity retention rates of secondary batteries of Examples 1 to 3 and Comparative Examples 1 to 7.

MODES OF THE INVENTION

The terms or words used in the present specification and claims should not be construed as being limited to ordinary or dictionary meanings and should be construed as meanings and concepts consistent with the spirit of the present invention based on the principle that an inventor can appropriately define concepts and terms to explain the invention of the inventor in the best way.

The terms used in the present specification are only used to describe specific various embodiments and are not intended to limit the present invention. It is to be understood that the singular forms include plural forms unless the context clearly dictates otherwise.

It should be understood that the terms "comprises," "comprising," "includes," "including," "contains," "including," "has," and/or "having," when used herein, specify the presence of stated features, integers, steps, operations, elements, components and/or combinations thereof, but do not preclude the presence or addition of one or more other features, integers, steps, operations, elements, components and/or combinations thereof.

In the present specification, an average particle size ($D_{50}$) may be defined as a particle size corresponding to 50% in a cumulative volume-based particle size distribution curve. The average particle diameter ($D_{50}$) may be measured using, for example, a laser diffraction method. The laser diffraction method may be used to measure a particle size in the range from submicrons to several millimeters, and may obtain results with high reproducibility and high resolution.

Hereinafter, the present invention will be described in detail.

Battery System

The present invention relates to a battery system, and specifically, to a battery system for a lithium secondary battery.

Specifically, the battery system of the present invention includes: at least one secondary battery including a negative electrode including a silicon-based active material, a positive electrode facing the negative electrode, a separator interposed between the positive electrode and the negative electrode, and an electrolyte; and a control unit configured to set a driving voltage range for charging and discharging of the secondary battery, wherein a maximum driving voltage of the secondary battery set by the control unit is in a range of 4.00 V to 4.08 V, and a minimum driving voltage of the secondary battery set by the control unit is in a range of 2.98 V to 3.07 V.

In general, the secondary battery may operate by being charged and discharged to a voltage range of 4.3 V to 2.5 V. However, when a negative electrode and a secondary battery including a silicon-based active material are used, the degree of volume expansion/contraction of the silicon-based active material may be excessive when the charging and discharging are performed in the above-described range, resulting in a rapid deterioration in lifespan performance. When the voltage range for charging and discharging of the secondary battery is narrowed in order to prevent this, the required energy density may not be satisfied.

Accordingly, in the present invention, the driving voltage range for charging and discharging of the secondary battery is set to a specific range, so that volume expansion/contraction of the silicon-based active material is prevented to an appropriate level. Thus, it is possible to achieve high energy density while remarkably improving the lifespan performance of the battery.

The secondary battery includes a negative electrode including a silicon-based active material, a positive electrode facing the negative electrode, a separator interposed between the negative electrode and the positive electrode, and an electrolyte.

The negative electrode includes a silicon-based active material, and a driving voltage range for charging and discharging, which will be described below, may be controlled, so that the high capacity and energy density of the silicon-based active material may be preferably exhibited while preventing the volume expansion/contraction of the silicon-based active material.

The negative electrode may include a negative electrode current collector, and a negative electrode active material layer formed on the negative electrode current collector, and the negative electrode active material layer may include the silicon-based active material.

The negative electrode current collector is not particularly limited as long as it has high conductivity without causing chemical changes in the battery. Specifically, as the negative electrode current collector, copper, stainless steel, aluminum, nickel, titanium, calcined carbon, copper or stainless steel whose surface has been treated with carbon, nickel, titanium, silver, or the like, an aluminum-cadmium alloy, or the like may be used.

A thickness of the negative electrode current collector may be in a range of 3 to 500 μm and preferably 5 to 50 μm, and preferably, 7 to 20 μm to realize thinning of the negative electrode containing the silicon-based active material.

The negative electrode current collector may have fine irregularities formed on a surface thereof to increase the binding force of the negative electrode active material. For example, the negative electrode current collector may be used in various forms such as a film, a sheet, a foil, a net, a porous body, a foamed body, a non-woven fabric, and the like.

The silicon-based active material may include a compound represented by $SiO_x$ ($0 \leq x < 2$). $SiO_2$ may not react with lithium ions and thus may not store lithium. Thus, it is preferable that x is within the above-described range.

Specifically, the silicon-based active material may include silicon (Si). Conventionally, Si is advantageous in that the capacity thereof is about 2.5 to 3 times higher than that of silicon oxide (e.g., $SiO_x$ ($0<x<2$)), but has a problem in that the commercialization thereof is not easy due to the very high degree of volume expansion/contraction of Si caused by charging and discharging compared to that of silicon oxide. However, according to the present invention, since the driving voltage range of the secondary battery is controlled to the above range, the volume expansion/contraction of Si may be minimized, and thus it is possible to effectively solve the problem of deterioration of lifespan characteristics, and advantages of high capacity, excellent rate characteristics, and high energy density of Si may be preferably realized.

The silicon-based active material may have an average particle diameter ($D_{50}$) of 1 μm to 10 μm, and preferably, 1.5 μm to 4 μm in view of ensuring the structural stability of the active material during charging and discharging, more smoothly forming a conductive network for maintaining electrical conductivity, and making it easier to settle on the binder for binding the active material and the current collector.

The silicon-based active material may be included in an amount of 60 wt % to 90 wt %, and preferably 70 wt % to 80 wt % in the negative electrode active material layer in view of sufficiently realizing the high capacity of the silicon-based active material in the secondary battery while minimizing the influence of the volume expansion/contraction of the silicon-based active material on the battery.

The negative electrode active material layer may further include a conductive material and/or a binder in addition to the above-described silicon-based active material.

The binder may be used to improve adhesion between the negative electrode active material layer and the negative electrode current collector to be described below, or to improve a binding force between the silicon-based active materials.

Specifically, the binder may include at least one selected from the group consisting of styrene butadiene rubber (SBR), acrylonitrile butadiene rubber, acrylic rubber, butyl rubber, fluoro rubber, polyvinyl alcohol, carboxymethylcellulose (CMC), starch, hydroxypropylcellulose, regenerated cellulose, polyvinyl alcohol (PVA), polyacrylic acid (PAA), polyethylene glycol (PEG), polyacrylonitrile (PAN), and polyacryl amide (PAM) in view of further improving electrode adhesion and imparting sufficient resistance to the volume expansion/contraction of the silicon-based active material.

Preferably, the binder may include at least one selected from the group consisting of polyvinyl alcohol, polyacrylic acid, polyacrylonitrile, and polyacryl amide and, preferably, may include polyvinyl alcohol and polyacrylic acid in view of having high strength, having excellent resistance to the volume expansion/contraction of the silicon-based active material, and imparting excellent flexibility to the binder so as to prevent an electrode from being warped, bent, and the like. When the binder includes polyvinyl alcohol and polyacrylic acid, the polyvinyl alcohol and polyacrylic acid may be included in a weight ratio of 50:50 to 90:10, and preferably, 55:45 to 80:20 in the binder in view of further enhancing the above-described effects.

The binder may include a binder in which hydrogen is substituted with Li, Na, or Ca in view of allowing the binder to be more easily dispersed in an aqueous solvent such as water when preparing a slurry for forming a negative electrode active material layer, and coating an active material more easily to improve a bonding force.

The binder may be included in an amount of 5 wt % to 30 wt %, and preferably 10 wt % to 20 wt % in the negative electrode active material layer, and when the content of the binder is within the above-described range, the binder bonds the silicon-based active material more easily, and accordingly, the problem of volume expansion of the active material may be minimized, the dispersion of the binder is facilitated during the preparation of the slurry for forming a negative electrode active material layer, and coating properties and phase stability of the slurry may be improved.

The conductive material may be used to assist and improve the conductivity of a secondary battery, and is not particularly limited as long as it does not cause a chemical change and has conductivity. Specifically, the conductive material may include at least one selected from the group consisting of graphite such as natural graphite, artificial graphite, or the like; carbon black such as carbon black, acetylene black, Ketjen black, channel black, furnace black, lamp black, thermal black, or the like; a conductive fiber such as carbon fibers, metal fibers, or the like; a conductive tube such as carbon nanotubes or the like; fluorocarbon; a metal powder such as aluminum powder, nickel powder, or the like; a conductive whisker such as zinc oxide, potassium titanate, or the like; a conductive metal oxide such as titanium oxide or the like; and a polyphenylene derivative, and preferably may include carbon black in view of realizing high conductivity.

The conductive material may have a specific surface area of 80 $m^2/g$ to 200 $m^2/g$, and preferably, 100 $m^2/g$ to 150 $m^2/g$ in view of facilitating dispersion of the conductive material when preparing a slurry for forming a negative electrode active material layer and further improving electrical conductivity.

The conductive material may be included in an amount of 5 wt % to 20 wt %, and preferably 7 wt % to 15 wt % in the negative electrode active material layer, and the amount of the conductive material in this range is preferable in view of forming an excellent conductive network while mitigating an increase in resistance due to the binder.

The negative electrode active material layer may have a thickness of 35 μm to 50 μm, and preferably 36 μm to 45 μm in view of realizing a thin film electrode and realizing high energy density.

The negative electrode may have an energy density of 575 Wh/L or more, and preferably 600 Wh/L. The battery system of the present invention may realize high energy density while solving the problem of volume expansion/contraction of a silicon-based active material through the adjustment of the above-described maximum driving voltage and minimum driving voltage.

The negative electrode may be manufactured by coating a negative electrode slurry including a negative electrode active material, and optionally, a binder, a conductive material, and a solvent for forming a negative electrode slurry onto the negative electrode current collector, and then performing drying and rolling.

For example, the solvent for forming a negative electrode slurry may include at least one selected from the group consisting of distilled water, ethanol, methanol, and isopropyl alcohol, and preferably may include distilled water in view of facilitating the dispersion of the negative electrode active material, the binder, and/or the conductive material.

The solvent for forming a negative electrode slurry may be included in the negative electrode slurry such that the concentration of the solid content including the negative electrode active material, and selectively, the binder and the conductive material is in a range of 15 wt % to 45 wt %, preferably, 20 wt % to 30 wt %, and more preferably, 24 wt % to 27 wt % in consideration of a viscosity, coating properties, dispersibility, and the like of the negative electrode slurry.

The positive electrode faces the negative electrode.

The positive electrode may include a positive electrode current collector and a positive electrode active material layer formed on the positive electrode current collector.

The positive electrode current collector is not particularly limited as long as it has high conductivity without causing chemical changes in the battery. Specifically, as the positive electrode current collector, copper, stainless steel, aluminum, nickel, titanium, calcined carbon, aluminum or stainless steel whose surface has been treated with carbon, nickel, titanium, silver, or the like, an aluminum-cadmium alloy, or the like may be used.

The positive electrode current collector may generally have a thickness of 3 to 500 µm.

The positive electrode current collector may have fine irregularities formed on a surface thereof to increase the binding force of a positive electrode active material. For example, the positive electrode current collector may be used in various forms such as a film, a sheet, a foil, a net, a porous body, a foamed body, a non-woven fabric, and the like.

The positive electrode active material layer may include a positive electrode active material.

The positive electrode active material is a compound enabling reversible intercalation and deintercalation of lithium, which may specifically include a lithium-transition metal complex oxide including lithium and at least one transition metal consisting of nickel, cobalt, manganese, and aluminum.

Specifically, the lithium-transition metal composite oxide may be a lithium-manganese-based oxide (e.g., $LiMnO_2$, $LiMn_2O_4$, and the like), a lithium-cobalt-based oxide (e.g., $LiCoO_2$ and the like), a lithium-nickel-based oxide (e.g., $LiNiO_2$ and the like), a lithium-nickel-manganese-based oxide (e.g., $LiNi_{1-Y}Mn_YO_2$ (where $0<Y<1$), $LiMn_{2-z}Ni_zO_4$ (where $0<z<2$), and the like), a lithium-nickel-cobalt-based oxide (e.g., $LiNi_{1-Y1}Co_{Y1}O_2$ (where $0<Y1<1$) and the like), a lithium-manganese-cobalt-based oxide (e.g., $LiCo_{1-Y2}Mn_{Y2}O_2$ (where $0<Y2<1$), $LiMn_{2-z1}Co_{z1}O_4$ (where $0<z1<2$), and the like), a lithium-nickel-manganese-cobalt-based oxide (e.g., $Li(Ni_pCo_qMn_{r1})O_2$ (where $0<p<1$, $0<q<1$, $0<r1<1$, $p+q+r1=1$) or $Li(Ni_{p1}Co_{q1}Mn_{r2})O_4$ (where $0<p1<2$, $0<q1<2$, $0<r2<2$, $p1+q1+r2=2$) and the like), or a lithium-nickel-cobalt-transition metal (M) oxide (e.g., $Li(Ni_{p2}Co_{q2}Mn_{r3}M_{s2})O_2$ (where M is selected from the group consisting of Al, Fe, V, Cr, Ti, Ta, Mg and Mo, each of p2, q2, r3 and s2 is the atomic fraction of elements which are independent of one another, and $0<p2<1$, $0<q2<1$, $0<r3<1$, $0<s2<1$, $p2+q2+r3+s2=1$) and the like), which may be used alone or in a mixture of two or more thereof. Among these, in view of improving the capacity characteristics and stability of a battery, the lithium-transition metal composite oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, and the like), or a lithium nickel-cobalt-aluminum oxide (e.g., $Li(Ni_{0.8}Co_{0.15}Al_{0.05})O_2$ and the like), and in consideration of the significant improvement caused by control of the type and content ratio of constituent elements for forming a lithium-transition metal composite oxide, the lithium-transition metal composite oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0152})O_2$, or $Li(Ni_{0.8}Mn_{0.1}Co_{0.1})O_2$, which may be used alone or in a mixture of two or more thereof.

More specifically, the lithium-transition metal composite oxide may include a transition metal including nickel, cobalt, and manganese, and lithium, and in this case, lifespan characteristics and energy density may be remarkably improved in the driving voltage range of the battery system, which will be described below.

The positive electrode active material may be included in an amount of 80 wt % to 99 wt %, and preferably, 92 wt % to 98.5 wt % in the positive electrode active material layer in consideration of sufficiently exhibiting the capacity of the positive electrode active material.

The positive electrode active material layer may further include a binder and/or a conductive material in addition to the above-described positive electrode active material.

The binder is a component for assisting the bonding between the active material and the conductive material and the bonding to the current collector. Specifically, the binder may include at least one selected from the group consisting of polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene terpolymer (EPDM), a sulfonated EPDM, styrene butadiene rubber, and fluorine rubber, and preferably, may include polyvinylidene fluoride.

The binder may be included in an amount of 1 wt % to 20 wt %, and preferably, 1.2 wt % to 10 wt % in the positive electrode active material layer in view of sufficiently ensuring the bonding force between components such as the positive electrode active material.

The conductive material may be used to assist and improve the conductivity of a secondary battery, and is not particularly limited as long as it does not cause a chemical change and has conductivity. Specifically, the conductive material may include at least one selected from the group consisting of graphite such as natural graphite, artificial graphite, or the like; carbon black such as carbon black, acetylene black, Ketjen black, channel black, furnace black, lamp black, thermal black, or the like; a conductive fiber such as carbon fibers, metal fibers, or the like; a conductive tube such as carbon nanotubes or the like; fluorocarbon; a metal powder such as aluminum powder, nickel powder, or the like; a conductive whisker such as zinc oxide, potassium titanate, or the like; a conductive metal oxide such as titanium oxide or the like; and a polyphenylene derivative, and preferably, may include carbon black in view of improving conductivity.

The conductive material may have a specific surface area of 80 $m^2$/g to 200 $m^2$/g, and preferably, 100 $m^2$/g to 150 $m^2$/g in view of facilitating dispersion of the conductive material when preparing a slurry for forming a positive electrode active material layer and further improving electrical conductivity.

The conductive material may be included in an amount of 1 wt % to 20 wt %, and preferably, 1.2 wt % to 10 wt % in the positive electrode active material layer in view of sufficiently ensuring electrical conductivity.

The positive electrode active material layer may have a thickness of 30 μm to 400 μm, and preferably 50 μm to 110 μm in consideration of the balance of capacities of the negative electrode and the positive electrode, and in view of minimizing the influence of volume expansion/contraction of the silicon-based active material in the negative electrode.

The positive electrode may be manufactured by coating a positive electrode slurry including a positive electrode active material, and optionally, a binder, a conductive material, and a solvent for forming a positive electrode slurry onto the positive electrode current collector, followed by drying and rolling.

The solvent for forming a positive electrode slurry may include an organic solvent such as N-methyl-2-pyrrolidone (NMP) or the like and may be used in an amount suitable for achieving preferable viscosity when the positive electrode active material, and optionally, a binder, a conductive material, and the like are included. For example, the solvent for forming a positive electrode slurry may be included in the positive electrode slurry such that the concentration of a solid content including the positive electrode active material, and optionally, the binder and the conductive material is in a range of 50 wt % to 95 wt %, and preferably, 70 wt % to 90 wt %.

The secondary battery may have an N/P ratio, which is calculated by Equation 1 below, of 1.5 to 3.5, and preferably, 1.8 to 2.3, N/P ratio=discharge capacity per unit area of negative electrode/discharge capacity per unit area of positive electrode. [Equation 1]

In the present invention, the "discharge capacity per unit area" refers to a discharge capacity per unit area of a negative electrode or a positive electrode at a first cycle.

The discharge capacity per unit area of the negative electrode may be obtained by the following method. Specifically, a half-cell is manufactured with a negative electrode sample including a negative electrode active material and a counter electrode (e.g., a lithium metal electrode) facing the negative electrode sample. A discharge capacity measured by charging and discharging the half-cell is divided by the weight of the negative electrode active material to obtain a "discharge capacity of the negative electrode sample per unit weight of the negative electrode active material." A secondary battery is manufactured with a negative electrode including a negative electrode active material identical to the negative electrode active material used in the half-cell and a positive electrode including a positive electrode active material. A value obtained by multiplying the "discharge capacity of the negative electrode sample per unit weight of the negative electrode active material" by the weight of the negative electrode active material included in the secondary battery is divided by the area of the negative electrode included in the secondary battery to obtain the "discharge capacity per unit area of the negative electrode."

The "discharge capacity per unit area of the positive electrode" may be obtained by the following method. Specifically, a half-cell is manufactured with a positive electrode sample including a positive electrode active material and a counter electrode (e.g., a lithium metal electrode) facing the positive electrode sample. A discharge capacity measured by charging and discharging the half-cell is divided by the weight of the positive electrode active material to obtain a "discharge capacity of the positive electrode sample per unit weight of the positive electrode active material." A secondary battery is manufactured with a positive electrode including a positive electrode active material identical to the positive electrode active material used in the half-cell and a negative electrode including a negative electrode active material. A value obtained by multiplying the "discharge capacity of the positive electrode sample per unit weight of the positive electrode active material" by the weight of the positive electrode active material included in the secondary battery is divided by the area of the positive electrode included in the secondary battery to obtain the "discharge capacity per unit area of the positive electrode."

When an N/P ratio (ratio of a discharge capacity of a positive electrode and a discharge capacity of a negative electrode) of the secondary battery of the present invention is adjusted to the above range, the discharge capacity of the negative electrode is designed to be greater than the discharge capacity of the positive electrode by a specific level, and thus when lithium is intercalated into the negative electrode from the positive electrode, the ratio of lithium to the entire silicon-based active material in the negative electrode may be reduced. Thus, the ratio of the silicon-based active material used in the negative electrode is reduced to a specific level, and accordingly, the deterioration of lifespan characteristics at the entire battery level caused by the volume expansion of the negative electrode may be minimized. In addition, since the N/P ratio is adjusted to the above-described level, it is possible to realize a secondary battery having high energy density, rate characteristics, and capacity characteristics due to the silicon-based active material while minimizing deterioration in lifespan characteristics of the battery due to the above-described volume expansion.

The separator is not particularly limited as long as it is generally used as a separator in a lithium secondary battery to separate a negative electrode from a positive electrode and provide a movement path for lithium ions, and particularly, it is preferable that the separator has low resistance to ion movement of an electrolyte and an excellent ability to be impregnated with an electrolyte solution. Specifically, a porous polymer film, for example, a porous polymer film formed of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof, may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

Further, as the electrolyte used in the present invention, an organic liquid electrolyte, an inorganic liquid electrolyte, a solid polymer electrolyte, a gel-type polymer electrolyte, a solid inorganic electrolyte, or a molten inorganic electrolyte, which may be used in manufacturing a secondary battery, may be used, but the present invention is not limited thereto.

Specifically, the electrolyte may include an organic solvent and a lithium salt.

The organic solvent is not specifically limited as long as it functions as a medium through which ions involved in an electrochemical reaction of a battery can move. Specifically, as the organic solvent, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bond, an aromatic ring or an ether bond); an amide-based solvent such as dimethylformamide; a dioxolane-based solvent such as 1,3-dioxolane; or a sulfolane-based solvent may be used. Among these, a carbonate-based solvent is preferably used, and a mixture of a cyclic carbonate having high ionic conductivity and a high dielectric constant, such as ethylene carbonate or propylene carbonate, which can increase the charge and discharge performance of the battery, and a linear carbonate-based compound with low viscosity (for example, ethyl methyl carbonate, dimethyl carbonate, diethyl carbonate, or the like) is more preferably used. In this case, when a cyclic carbonate and a chain-type carbonate are mixed in a volume ratio of about 1:1 to about 1:9, the electrolyte solution may exhibit excellent performance.

The lithium salt may be used without particular limitation as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used as the lithium salt. The concentration of the lithium salt is preferably in a range of 0.1 to 2.0 M. When the concentration of the lithium salt is in the above-described range, the electrolyte has suitable conductivity and viscosity and thus may exhibit excellent electrolyte performance, and the lithium ions may effectively move.

One or more of the secondary batteries may be included in the battery system.

For example, the secondary battery may be included in the battery system in the form of a secondary battery cell made of one secondary battery or a secondary battery module that is an aggregate of a plurality of secondary batteries.

The secondary battery may be manufactured by a conventional method of manufacturing a secondary battery, that is, by interposing a separator between the above-described negative electrode and positive electrode and injecting an electrolyte solution.

The control unit may set a driving voltage range for charging and discharging of the secondary battery. Accordingly, the charging and discharging of the secondary battery may be performed within the driving voltage range of the secondary battery set by the control unit.

The control unit is not particularly limited as long as it is capable of controlling the driving voltage range for charging and discharging of the secondary battery, and may be, for example, an electrochemical charging and discharging device. Specifically, the control unit may be embedded in a battery management system (BMS) included in a battery pack.

A maximum driving voltage of the secondary battery set by the control unit is in a range of 4.00 V to 4.08 V, and a minimum driving voltage of the secondary battery set by the control unit is in a range of 2.98 V to 3.07 V. The charging and discharging of the secondary battery may be performed within a range from the set maximum driving voltage to the set minimum driving voltage.

When the maximum driving voltage is less than 4.00 V, the driving voltage range becomes narrow, and thus the required level of energy density may not be achieved. When the maximum driving voltage is greater than 4.08 V, the volume expansion of the silicon-based active material is not sufficiently controlled as the capacity of the active material to be exhibited increases, and thus lifespan performance may be rapidly deteriorated.

When the minimum driving voltage is less than 2.98 V, interparticle separation may occur due to the shrinkage of the active material, and conductive connections between the active materials may be broken, and thus lifespan performance may be rapidly deteriorated. When the minimum driving voltage is greater than 3.07 V, the driving voltage range becomes narrow, and thus the required level of energy density may not be achieved.

Specifically, the maximum driving voltage of the secondary battery set by the control unit may be in a range of 4.03 V to 4.07 V, and the minimum driving voltage of the secondary battery set by the control unit may be in a range of 3.03 V to 3.06 V. When the driving voltage is within the above range, the above-described effect of simultaneously improving lifespan characteristics and energy density may be more preferably realized.

Method of Using Battery System

The present invention provides a method of using a battery system, and more particularly, to a method of using the battery system described above. Specifically, the method of using the battery system may be a method of using a battery system for a lithium secondary battery.

Specifically, the method of using the battery system of the present invention includes manufacturing a battery system including at least one secondary battery and a control unit configure to set a driving voltage range for charging and discharging of the secondary battery; and setting the driving voltage range such that a maximum driving voltage of the secondary battery is in a range of 4.00 V to 4.08 V and a minimum driving voltage of the secondary battery is in a range of 2.98 V to 3.07 V through the control unit and charging and discharging the secondary battery for at least one cycle, wherein the secondary battery includes a negative electrode including a silicon-based active material, a positive electrode facing the negative electrode, a separator interposed between the negative electrode and the positive electrode, and an electrolyte.

In the method of using the battery system of the present invention, the maximum driving voltage and the minimum driving voltage are set to the above-described levels through the control unit, and the battery system is operated by charging and discharging the secondary battery from the set maximum driving voltage to the set minimum driving voltage. In the secondary battery in which charging and discharging are performed by adjusting the driving voltage range to the above-described level, the volume expansion/contraction of the silicon-based active material is minimized, so that high energy density may be achieved while improving lifespan performance.

The secondary battery and control unit may be the same as the above-described secondary battery and control unit.

Battery Pack

Further, the present invention provides a battery pack including the battery system described above.

The battery pack may further include components known in the art, for example, a BMS, a cooling system, and the like in addition to the secondary battery and the control unit described above.

The battery system or the battery pack according the present invention is useful in portable devices such as mobile phones, notebook computers, and digital cameras and an electric vehicle field such as hybrid electric vehicles (HEVs). The battery system or the battery pack is preferably applied to a power source for a device requiring a high power and a large capacity, for example, an electric vehicle, an HEV, or a power storage device.

Hereinafter, examples of the present invention will be described in detail so that those of ordinary skill in the art can easily carry out the present invention. However, the present invention may be embodied in various different forms and is not limited to the examples described below.

Manufacturing Examples

Manufacturing Example 1: Manufacture of Secondary Battery

<Manufacture of Negative Electrode>

A silicon-based active material Si (average particle diameter ($D_{50}$): 3.5 μm) as a negative electrode active material, carbon black (product name: Super C65, manufacturer: TIMCAL) as a conductive material, and a mixture (weight average molecular weight: about 360,000 g/mol) obtained by mixing polyvinyl alcohol and polyacrylic acid in a weight ratio of 66:34 as a binder were added to distilled water as a solvent for forming a negative electrode slurry in a weight ratio of 75:10:15 to prepare a negative electrode slurry (solid content concentration of 25 wt %).

The negative electrode slurry was coated in a loading amount of 68.4 mg/25 cm$^2$ on one surface of a copper current collector (thickness: 8 μm) as a negative electrode current collector, roll-pressed, and dried in a 130° C. vacuum oven for 10 hours to form a negative electrode active material layer (thickness: 44 μm), thereby manufacturing a negative electrode (the negative electrode had a thickness of 52 μm).

<Manufacture of Positive Electrode>

A mixture obtained by mixing $LiNi_{0.6}Co_{0.2}Mn_{0.2}O_2$ (average particle diameter ($D_{50}$): 10 μm) as a positive electrode active material, carbon black (product name: Super C65, manufacturer: TIMCAL) as a conductive material, and polyvinylidene fluoride (PVdF) as a binder in a weight ratio of 97:1.5:1.5 was added to N-methyl-2-pyrrolidone (NMP) as a solvent for forming a positive electrode slurry to prepare a positive electrode slurry (solid content concentration of 72 wt %).

The positive electrode slurry was coated in a loading amount of 459.4 mg/25 cm$^2$ on one surface of an aluminum current collector (thickness: 12 μm) as a positive electrode current collector, roll pressed, and dried in a 130° C. vacuum oven for 10 hours to form a positive electrode active material layer (thickness: 110 μm), thereby manufacturing a positive electrode (the positive electrode had a thickness of 122 μm).

<Manufacture of Secondary Battery>

A polyethylene/polypropylene/polyethylene separator was interposed between the negative electrode and the positive electrode, which were manufactured above, and an electrolyte was injected to manufacture a secondary battery of Manufacturing Example 1. The electrolyte was prepared by adding vinylene carbonate at 3 wt % with respect to the total weight of the electrolyte to an organic solvent in which fluoroethylene carbonate (FEC) and DMC were mixed in a volume ratio of 30:70 and adding $LiPF_6$ as a lithium salt at a concentration of 1 M.

<Measurement of N/P Ratio>

The negative electrode manufactured above was cut into a predetermined size to manufacture a negative electrode sample. A lithium metal electrode of the same size as the negative electrode sample was prepared and disposed to face the negative electrode sample. A polyethylene separator was interposed between the negative electrode sample and the lithium metal electrode, and then an electrolyte solution was injected to manufacture a coin-type half-cell. The electrolyte solution was prepared by adding $LiPF_6$ as a lithium salt at a concentration of 1 M to an organic solvent in which ethylene carbonate and ethyl methyl carbonate were mixed in a volume ratio of 50:50. A discharge capacity obtained by charging/discharging the coin-type half-cell at 0.1 C was divided by the weight of the negative electrode active material included in the negative electrode sample, thereby obtaining a discharge capacity of the negative electrode sample per unit weight of the negative electrode active material.

Further, the positive electrode manufactured above was cut into a predetermined size to manufacture a positive electrode sample. A lithium metal electrode of the same size as the positive electrode sample was prepared and disposed to face the positive electrode sample. A polyethylene separator was interposed between the positive electrode sample and the lithium metal electrode, and then an electrolyte solution was injected to manufacture a coin-type half-cell. The electrolyte solution was prepared by adding $LiPF_6$ as a lithium salt at a concentration of 1 M to an organic solvent in which ethylene carbonate and ethyl methyl carbonate were mixed in a volume ratio of 50:50. A discharge capacity obtained by charging/discharging the coin-type half-cell at 0.1 C was divided by the weight of the positive electrode active material included in the positive electrode sample, thereby obtaining a discharge capacity of the positive electrode sample per unit weight of the positive electrode active material.

A value obtained by multiplying the discharge capacity of the negative electrode sample per unit weight of the negative electrode active material, which was measured above, by the weight of the negative electrode active material of the secondary battery manufactured in Manufacturing Example 1 was divided by the area of the negative electrode to obtain the discharge capacity per unit area of the negative electrode of the Manufacturing Example 1. Further, a value obtained by multiplying the discharge capacity of the positive electrode sample per unit weight of the positive electrode active material, which was measured above, by the weight of the positive electrode active material of the secondary battery manufactured in Manufacturing Example 1 was divided by the area of the positive electrode to obtain the discharge capacity per unit area of the positive electrode of the Manufacturing Example 1.

The discharge capacity per unit area of the negative electrode was divided by the discharge capacity per unit area of the positive electrode to obtain an N/P ratio of 2.0.

Manufacturing Example 2: Manufacture of Secondary Battery

<Manufacture of Negative Electrode>

The negative electrode slurry of Manufacturing Example 1 was coated in a loading amount of 88.8 mg/25 cm$^2$ on one surface of a copper current collector (thickness: 8 μm) as a negative electrode current collector, roll-pressed, and dried in a 130° C. vacuum oven for 10 hours to form a negative electrode active material layer (thickness: 57 μm), thereby manufacturing a negative electrode (the negative electrode had a thickness of 65 μm).

<Manufacture of Positive Electrode>

The positive electrode manufactured in Manufacturing Example 1 was used.

<Manufacture of Secondary Battery>

A secondary battery of Manufacturing Example 2 was manufactured in the same manner as in Manufacturing Example 1 except that the negative electrode and the positive electrode manufactured above were used.

<N/P Ratio>

An N/P ratio (=2.6) of the secondary battery of Manufacturing Example 2 was measured in the same manner as in Manufacturing Example 1.

EXAMPLES

Examples 1 to 3 and Comparative Examples 1 to 7

<Manufacture of Battery System>

The secondary batteries of Manufacturing Examples 1 and 2 manufactured above were connected to an electrochemical charging and discharging device.

Battery systems of Examples 1 to 3 and Comparative Examples 1 to 7 were manufactured by adjusting the type of secondary battery, and a maximum driving voltage and a minimum driving voltage set by a control unit as shown in Table 1 below.

TABLE 1

| | Secondary battery | | Driving voltage range | |
|---|---|---|---|---|
| | Manufacturing Example | N/P ratio | Maximum voltage (V) | Minimum voltage (V) |
| Example 1 | 1 | 2.0 | 4.05 | 3.05 |
| Example 2 | 2 | 2.6 | 4.05 | 3.05 |
| Example 3 | 1 | 2.0 | 4.05 | 3.00 |
| Comparative Example 1 | 1 | 2.0 | 4.05 | 3.10 |
| Comparative Example 2 | 1 | 2.0 | 4.10 | 3.15 |
| Comparative Example 3 | 1 | 2.0 | 4.15 | 3.15 |
| Comparative Example 4 | 1 | 2.0 | 4.20 | 3.00 |
| Comparative Example 5 | 1 | 2.0 | 4.20 | 3.20 |
| Comparative Example 6. | 1 | 2.0 | 4.20 | 3.30 |
| Comparative Example 7 | 1 | 2.0 | 3.98 | 3.05 |

EXPERIMENTAL EXAMPLES

Experimental Example 1: Thickness Expansion Rate at Full Charge

The battery systems manufactured in Examples 1 to 3 and Comparative Examples 1 to 7 were charged to the maximum voltage of Table 1 at 0.5 C in constant current (CC)/constant voltage (CV) mode (the maximum voltage of Table 1, 0.05 C current cut-off), and a thickness expansion rate of the negative electrode at a fully charged state was measured according to Equation 2 below, $$\text{thickness expansion rate of negative electrode at full charge } (\%) = \{(d_{a2}-d_{a1})/d_{a1}\} \times 100 \quad \text{[Equation 2]}$$

where, $d_{a2}$ is a thickness of the negative electrode active material layer at full charge, and $d_{a1}$ is a thickness of the negative electrode active material layer before charging. The result is shown in Table 2 below.

Experimental Example 2: Thickness Variation Difference at Full Charge/Full Discharge The battery systems manufactured in Examples 1 to 3 and Comparative Examples 1 to 7 were charged and discharged under the following conditions to calculate a thickness variation difference (%) at full charge/full discharge according to Equation 3 below.

<Charging and Discharging Conditions> charging: charging was performed in a CC/CV mode at 0.5 C to the maximum voltage in Table 1 (maximum voltage of Table 1, 0.05 C current cut-off) discharging: discharging was performed in a CC mode at 0.5 C to the minimum voltage in Table 1 (cut-off at the minimum voltage in Table 1)

$$\text{thickness variation difference at full charge/full discharge } (\%) = \{(d_{b2}-d_{b1})/d_{b1}\} \times 100 \quad \text{[Equation 3]}$$

where, $d_{b2}$ is a thickness of the negative electrode active material layer at full charge, and $d_{b1}$ is a thickness of the negative electrode active material layer at full discharge. The result is shown in Table 2 below.

Experimental Example 3: Capacity Retention Rate

The capacity retention rate of each of the battery systems manufactured in Examples 1 to 3 and Comparative Examples 1 to 7 was evaluated.

The secondary battery was charged and discharged up to the 200th cycle under the following charging and discharging conditions. The capacity retention rate was evaluated using Equation 4 below. Results thereof are shown in FIG. 1 and Table 2 below.

<Charging and Discharging Conditions> charging: charging was performed in a CC/CV mode at 0.5 C to the maximum voltage in Table 1 (maximum voltage of Table 1, 0.05 C current cut-off)

discharging: discharging was performed in a CC mode at 0.5 C to the minimum voltage in Table 1 (cut-off at the minimum voltage in Table 1)

$$\text{capacity retention rate } (\%) = (\text{discharge capacity at 200th cycle/discharge capacity at first cycle}) \times 100 \quad \text{[Equation 4]}$$

Experimental Example 4: Energy density

The battery systems manufactured in Examples 1 to 3 and Comparative Examples 1 to 7 were charged and discharged once under the following charging and discharging conditions.

<Charging and Discharging Conditions> charging: charging was performed in a CC/CV mode at 0.5 C to the maximum voltage in Table 1 (maximum voltage of Table 1, 0.05 C current cut-off)

discharging: discharging was performed in a CC mode at 0.5 C to the minimum voltage in Table 1 (cut-off at the minimum voltage in Table 1).

Afterward, the energy densities of the negative electrodes in the battery systems of Examples 1 to 3 and Comparative Examples 1 to 7 were measured and calculated by Equation 5 below, energy density (Wh/L)={discharge capacity at first cycle (Ah)×average voltage (V)}/(volume of negative electrode upon completion of charging at first cycle (L))     [Equation 5]

where watt-hour (Wh) obtained by multiplying a voltage, a current, and a discharge time at a time point at which discharging is ended by reaching a minimum voltage, was divided by a discharge capacity at a first cycle to obtain the average voltage.

TABLE 2

| | Negative electrode thickness expansion rate at full charge (%) | Thickness variation difference at full charge/full discharge (%) | Capacity retention rate (%) | Energy density (Wh/L) |
|---|---|---|---|---|
| Example 1 | 15.9 | 5.5 | 93.5 | 614 |
| Example 2 | 13.2 | 4.0 | 95.2 | 580 |
| Example 3 | 15.9 | 5.9 | 91.0 | 637 |
| Comparative Example 1 | 15.9 | 5.1 | 93.8 | 581 |
| Comparative Example 2 | 16.6 | 5.5 | 93.0 | 568 |
| Comparative Example 3 | 16.8 | 5.7 | 93.3 | 584 |
| Comparative Example 4 | 17.4 | 7.5 | 85.1 | 640 |
| Comparative Example 5 | 17.4 | 5.7 | 87.7 | 557 |
| Comparative Example 6 | 17.4 | 4.7 | 89.1 | 462 |
| Comparative Example 7 | 15.7 | 5.0 | 94.5 | 577 |

Referring to Table 2, it can be seen that lifespan characteristics and energy density are simultaneously improved in the case of Examples 1 to 3 using the battery systems according to the present invention.

On the other hand, in the case of Comparative Examples 1 to 7 in which charging and discharging were not performed at the maximum and minimum driving voltages of the present invention, it can be seen that the energy density is too low due to the difficulty in exhibiting sufficient capacity of the silicon-based active material, and the lifespan characteristics are too low due to the difficulty in controlling the volume expansion of the silicon-based active material.

The invention claimed is:

1. A battery system comprising:
one or more secondary batteries each including a negative electrode including a silicon-based active material, a positive electrode facing the negative electrode, a separator interposed between the negative electrode and the positive electrode, and an electrolyte; and
a control unit configured to set a driving voltage range for charging and discharging of the secondary batteries,
wherein a maximum driving voltage of the secondary battery set by the control unit is in a range of 4.00 V to 4.08 V, and a minimum driving voltage of the secondary battery set by the control unit is in a range of 2.98 V to 3.07 V.

2. The battery system of claim 1, wherein the silicon-based active material is silicon (Si).

3. The battery system of claim 1, wherein
the negative electrode includes a negative electrode current collector and a negative electrode active material layer disposed on the negative electrode current collector, and
the negative electrode active material layer includes the silicon-based active material, a binder, and a conductive material.

4. The battery system of claim 3, wherein the binder includes at least one selected from the group consisting of styrene butadiene rubber, acrylonitrile butadiene rubber, acrylic rubber, butyl rubber, fluoro rubber, polyvinyl alcohol, carboxymethylcellulose, starch, hydroxypropylcellulose, regenerated cellulose, polyvinyl alcohol, polyacrylic acid, polyethylene glycol, polyacrylonitrile, and polyacryl amide.

5. The battery system of claim 3, wherein
the silicon-based active material is included in the negative electrode active material layer in an amount of 60 wt % to 90 wt %,
the binder is included in the negative electrode active material layer in an amount of 5 wt % to 30 wt %, and
the conductive material is included in the negative electrode active material layer in an amount of 5 wt % to 20 wt %.

6. The battery system of claim 3, wherein the negative electrode active material layer has a thickness of 35 μm to 50 μm.

7. The battery system of claim 1, wherein an N/P ratio of the secondary battery calculated by Equation 1 below is in a range of 1.5 to 3.5, N/P ratio=discharge capacity per unit area of negative electrode/discharge capacity per unit area of positive electrode.     [Equation 1]

8. The battery system of claim 1, wherein:
a positive electrode active material includes a lithium-transition metal composite oxide, and
the lithium-transition metal composite oxide includes lithium and at least one transition metal selected from the group consisting of nickel, cobalt, manganese, and aluminum.

9. A battery pack comprising the battery system of claim 1.

10. A method of using a battery system, comprising:
manufacturing a battery system including one or more secondary batteries and a control unit that is configured to set a driving voltage range for charging and discharging of the secondary batteries; and
setting the driving voltage range such that a maximum driving voltage of the secondary battery is in a range of 4.00 V to 4.08 V and a minimum driving voltage of the secondary battery is in a range of 2.98 V to 3.07 V through the control unit and the charging and discharging the secondary battery for at least one cycle,
wherein the secondary battery includes a negative electrode including a silicon-based active material, a positive electrode facing the negative electrode, a separator interposed between the negative electrode and the positive electrode, and an electrolyte.

* * * * *